May 5, 1970     M. BOIVENT     3,510,289
CYCLONE TYPE GLASS FURNACE
Original Filed Aug. 17, 1964     2 Sheets-Sheet 1
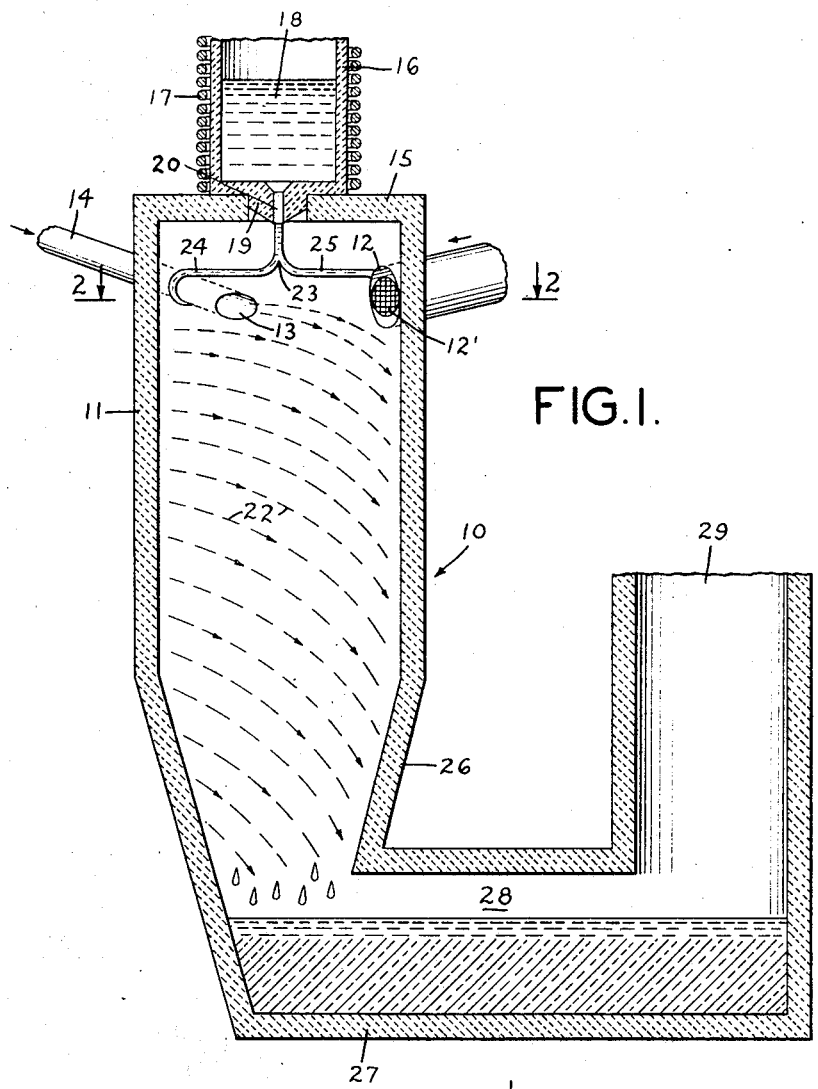
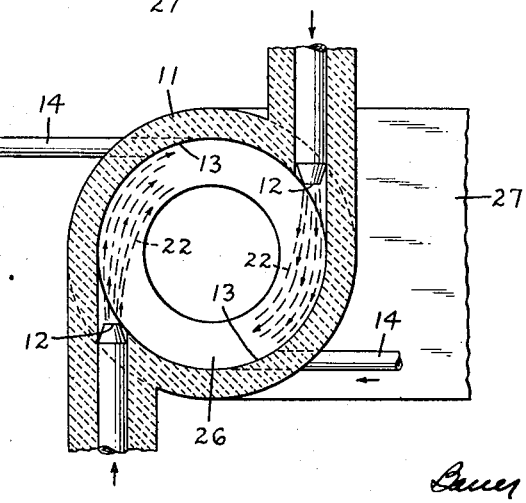
INVENTOR
MARCEL BOIVENT
ATTORNEYS May 5, 1970   M. BOIVENT   3,510,289
CYCLONE TYPE GLASS FURNACE
Original Filed Aug. 17, 1964   2 Sheets-Sheet 2

FLOW OF HOT GASES

INVENTOR
MARCEL BOIVENT

ATTORNEYS

United States Patent Office 3,510,289
Patented May 5, 1970

3,510,289
CYCLONE TYPE GLASS FURNACE
Marcel Boivent, Villejuif, France, assignor to Compagnie de Saint-Gobain, Neuilly-sur-Seine, France
Original application Aug. 17, 1964, Ser. No. 389,881, now Patent No. 3,443,921, dated May 13, 1969. Divided and this application Oct. 31, 1968, Ser. No. 772,083
Claims priority, application France, Aug. 22, 1963, 945,369
Int. Cl. C03b 3/00
U.S. Cl. 65—335                                              12 Claims

ABSTRACT OF THE DISCLOSURE

A method of making glass comprising melting a low-melting part of the glass, forming a cyclonic flame at melting temperature, introducing finely divided solid materials of the batch into the periphery of the cyclonic flame, and introducing the molten materials into the central part of the cyclonic flame as a stream, thereby subjecting it to disruption and centrifugal dispersion through the finely divided solids in the flame.

---

This application is a division of application 389,881, filed Aug. 17, 1964, now Pat. No. 3,443,921, issued May 13, 1969.

This invention relates to a method for the manufacture of glass and to novel glass furnaces. The method is particularly adapted to use with cyclonic furnaces, and the method invention will be described in connection with the description of the novel furnace.

Cyclone furnaces are known in which a cyclonic flame is generated and the finely divided raw materials are admitted through ports in the furnace cover, or in which the gases of combustion entrain the raw materials and introduce them through the burner ports. The glass begins to form in the upper part of the furnace and it is fined as it flows in thin layers toward the base of the furnace. Such furnaces have had imperfections: For a given volume of composition the surface of contact between the hot gases and the batch has been too low; the rate of fusion has been too low; the size of the furnace and hence its cost has been greater than good efficiency requires; the thermal efficiency has been too low.

A particular disadvantage of the prior art cyclone furnaces has been that they do not permit the efficient preheating of the batch, which must be introduced as unagglomerated grains and which can only be heated to a temperature below the fritting temperature of the batch. When that temperature is exceeded the grains form agglomerates and it becomes impossible to handle them or to melt them in the cyclone.

An object of the invention is to improve the construction and the efficiency of cyclone furnaces, to improve the feeding of raw materials to cyclone furnaces, to achieve more efficient melting of the batch and more homogeneous glass formation in the cyclone, to achieve better melting with less heat, to reduce the size of cyclone furnaces while maintaining at least equal efficiency, and to centrifugally and cyclonically mingle the elements of the batch. By this type of feeding the centrifugal materials enter the main blast from the burners transversely and are subjected to intense physical disruptive action by the flame and by the contents of the flame.

The objects of the invention are accomplished, generally speaking, by a method of making glass which comprises melting a low-melting part of the glass, forming a cyclonic flame at melting temperature, introducing finely divided solid materials of the batch into the periphery of the cyclonic flame, and introducing the molten materials into the central part of the cyclonic flame as a stream, thereby subjecting it to disruption and centrifugal dispersion through the finely divided solids in the flame; and by a glass furnace comprising a melting cyclone, a fining tank operatively connected thereto, means to supply molten and granular raw materials to the cyclone, and means to mix the molten and granular materials at glass forming temperature comprising peripherally aligned burner means in the cyclone.

It is preferred to distribute the molten fraction centrifugally but the distribution may be reversed by injecting solids into the flame centrifugally and the molten fraction otherwise. The raw materials of the batch, in either case, are admitted to the furnace in different physical states, the more fusible as liquids and the less fusible as finely divided solids. By separating the batch in two or more fractions each of the fractions may be heat treated separately before introduction to the furnace, thus permitting each fraction to be raised to the most efficient temperature for its reaction with the other ingredients of the batch, saving heat by using only the quantity of heat required by each fraction, overheating of one material to attain proper temperature for another being avoided, and materially increasing the speed of reaction within the cyclone.

In general practice with ordinary window glass and similar compositions it suffices to separate the raw materials containing alkali ions from sand and materials containing alkali earth ions, the alkali fraction being melted and introduced as a liquid and the remainder being introduced as a finely divided solid. A primary advantage of this method is that elements of the composition can be preheated far above the limiting temperatures of the prior art, which had an upper limit circa 700–750° C., at which they began to agglomerate and fuse into masses which could not be accepted or appropriately treated by the furnace.

Preheating of the composition or of certain fractions may be advantageously accomplished by the hot gas discharged from the cyclone furnace, or from an external source, and it may involve precise temperature control by the joint use of heating means and cooling means, for instance in the case of a furnace (FIG. 3) in which the shaft is provided with a water cooling jacket 11.

A valuable feature of the invention lies in pretreating the carbonates of the batch separately at a temperature which removes all or a part of the carbon oxide gases and delivers the fraction to the furnace as oxides. The alkali earth carbonates, for example, may be decomposed to the oxides at temperatures below 900° C., and the oxides can then be heated to 1400° C. without fritting or forming agglomerates. This preliminary removal of $CO_2$ also facilitates the fining of the glass.

Another valuable feature of the invention involves the use of centrifugal force within the cyclone furnace to atomize that part of the composition which is introduced as a liquid. The liquid fraction is introduced at the top of the center of the cyclone as a thread or thin stream, and is picked up by the cyclonically whirling gases, being torn apart with violence and atomized by the flame and the solid fraction which it carries. This action can be increased in effectiveness by projecting the liquid from a centrifugal spinner into and transversely to the course of the hot, cyclonic gases. The particles of liquid and solid acting transversely to each other, combined with the transverse action of the gases and centrifugally moving particles, produces exception speed and efficiency of glass formation.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical sectional view through a simple but novel cyclonic furnace embodying construction adequate to accomplish the method of the invention;

FIG. 2 is a section on line 2—2 of FIG. 1;

Figure 3:
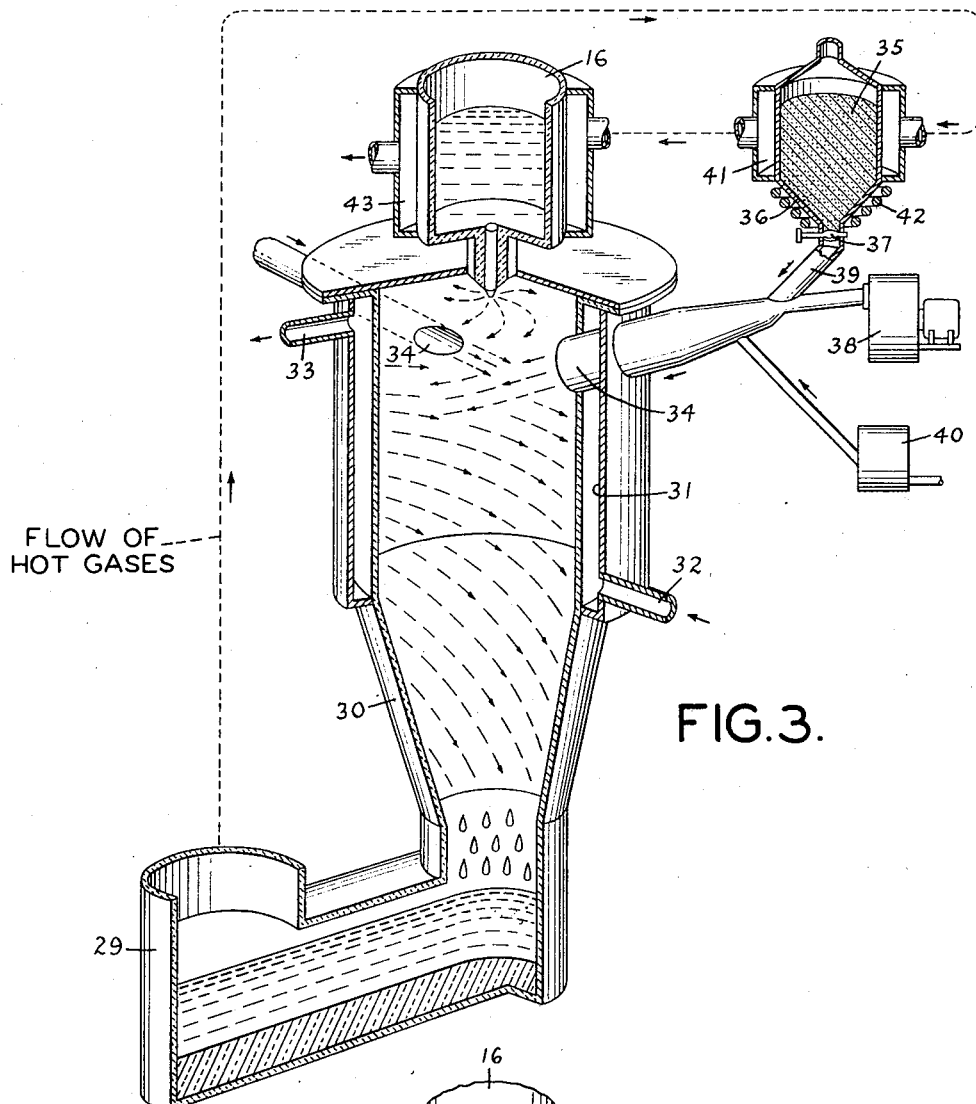
FIG. 3 is a perspective, somewhat diagrammatic view, partly in vertical section, of a more complex type of novel cyclonic furnace.

According to FIG. 1 a cyclone furnace 10, built of refractory brick, includes a shaft 11 of circular section which has ports 12 at its upper end of the injection of flame at melting temperature, which temperature need not differ from prior practice, may attain circa 1500° C. and may be supplied by oil burners, and ports 13 for the admission of granular raw materials which arrive through conduits 14 from a source not shown. Centrally mounted in the cover 15 of the shaft is a melting pot, reservoir, or bushing 16 encircled by heating means 17, the function of which is to maintain a fraction of the batch 18 in molten condition. The bottom of the bushing has a cylindrical projection 19 which fits a circular opening in the cover. The projection has a conduit 20 through which the molten batch material, usually the alkali salts or oxides, flows axially into the furnace shaft.

As shown in FIG. 2 the burners 12 are directed tangentially along the wall and set up a cyclonic, helical course for the gases in the shaft, as indicated by the dash lines 22, and these rapidly rotating, hot gases pick up the granular raw materials which are fed through conduits 14 and ports 13 into the top of the shaft. At the same time the whirling gases pick up the stream 23 of molten batch material from the bushing and spin it centrifugally outward as at 24, 25 into contact with the solids, the gases and the particles flowing with them acting to disrupt and atomize the stream. The solid and liquid parts of the batch react to form glass in the shaft and the glass is received in tank 27 after passing through a conical section 26 which has the effect of bringing the globules of molten glass into closer contact and of maintaining high speed in gases which may have been cooled somewhat. The tank 27 is covered and of such height that the hot gases flow through a passage 28 above and in contact with the glass, and fine it or condition it if fining has been completed in the cyclone. Means to withdraw the glass may be according to the prior art and are not shown. At the end of the passage 28 is the stack 29 through which the gases are discharged to heat recouperators or to preheat the raw materials of the batch as diagrammatically indicated in FIG. 3.

The furnace of FIG. 3 is of refractory metal having a shaft 30, the upper part of which is enclosed within a heat exchanger jacket 31 which has ports of entry and discharge 32, 33 for the cooling or heating fluid. A reservoir 16 holds liquid raw materials, but the flame ports 34 receive granular raw materials 35 from a hopper 36 which is provided with a constrictive valve 37 to control the flow. A blower 38 drives air past the conduit 39, which delivers material from the hopper to the conduit 34. A fuel pump 40 supplies fuel to a burner in the conduit.

The stack gases flow to a jacket 41 which encircles the hopper, and other heating means 42 supplies any additional heat that may be needed to bring the granules 35 up to optimum temperature for interaction with the molten material from bushing 16. From the jacket 41 the gases flow to a jacket 43 about the bushing, and from thence, largely exhausted of heat, they can be discharged.

Figure 4:
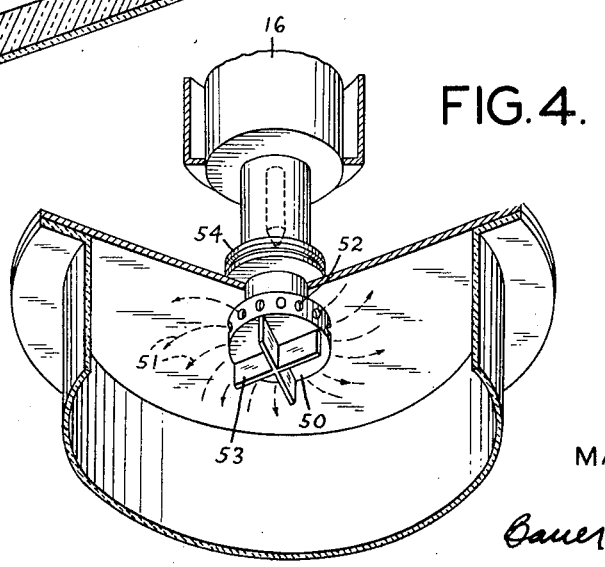
FIG. 4 is a sectional perspective view of a modification of a cyclonic furnace embodying a centrifugal feed for molten materials.

In FIG. 4 is shown a valuable modification in which a centrifugal rotor 50 receives the flow from bushing 16, and projects streams of glass 51 centrifugally into the helical flow of gases from the burners. The rotor 50 may be hollow inside, provided with peripheral apertures 52 of any chosen size, usually from micronic to millimetric, and mounted on a suitable bearing. Rotation may be achieved by putting vanes 53 on the bottom of the rotor, to be driven by the cyclonic gases from the burners, or by external means such as a driven pulley 54. Velocities of rotation can be chosen at will, but usually will be selected to project the globules of molten raw material almost completely through the gas stream so that all solid particles will be encountered by a molten particle.

The following examples illustrate the invention without imposing limits on the generality of what is elsewhere herein stated:

In these examples, the composition of a batch was, by weight, 70% $SiO_2$, 15% $Na_2O$, and 15% CaO. The $SiO_2$ of the batch, finely divided such as sand, was injected into the furnace through ports 13 which enclose the nozzles 12' of the burners. The burners were capable of generating temperatures above 1500° C. when necessary.

The Na is introduced in the form of $Na_2CO_3$ and is molten in the reservoir 16 at a temperature of 850–950° C. The Ca is introduced in the form of $CaCO_3$ and is preheated at a temperature of 1200 to 1500° C. On preheating, $CaCO_3$ disintegrated and released $CO_2$ gas. The $Na_2CO_3$, molten in the reservoir 16, is fed in the cyclonic gaseous current in the furnace.

The velocity of the gases was preferably kept at 20 m./sec. at the ports as this produced a good atomization of the liquid component. It is advantageous to introduce the solids by the burner ports rather than by separate ports, and this was done with the $SiO_2$ and $CaCO_3$.

The product gathered in the bottom of the furnace was 100 parts of excellent glass substantially having the composition of its batch ingredients less the expelled gases.

EXAMPLE 1

25.6 parts of $Na_2CO_3$ was molten to 850–950° C. The solid fraction included 70 parts of $SiO_2$ and 26.8 parts of $CaCO_3$ which were preheated to 1200–1300° C. before injection into the furnace. When introduced separately in another test they were heated to 1500° C. The furnace conditions were as stated above. The product recovered was excellent glass.

EXAMPLE 2

29.5 parts of liquid sodium metasilicate at about 1400° C. was admitted centrally to the furnace and 55.5 parts of $SiO_2$ and 26.8 parts of $CaCO_3$ were heated together at 1200–1300° C. and injected as solids. An excellent glass was formed.

EXAMPLE 3

44 parts of liquid sodium disilicate at about 1400° C. was admitted to the cyclone. The solids were injected through ports, 41 parts of silica and 26.8 parts of $CaCO_3$ being used. The glass produced was of excellent quality.

The advantages of the invention are in the accomplishment of the objects of the invention, the reduction of furnace size, reduction of fuel cost, perfection of melting, improved quality of glass, superiority of process, improved mixing of the liquid and solid components, and better atomization of the liquid component.

The centrifugal distribution of the molten component into the cyclonic gases is a material improvement over prior methods.

As many apparently widely different embodiments of the present invention may be made without departing from the spirit and scope thereof, it is to be understood that the invention is not limited to the specific embodiments.

What is claimed is:

1. In a glass-making cyclone-type furnace for mixing by centrifugal swirl, liquid raw batch ingredients of lower melting point, and granular raw batch ingredients of higher melting point, a tubular shaft having a central vertical axis of symmetry, a cover closing said shaft at its top end, there being a plurality of ports in and through the wall of said shaft adjacent the top end thereof and tangentially of said axis, a hopper for granular raw batch ingredients, first conduit means connecting said hopper and said ports to supply granular ingredients to said shaft, there also being a plurality of ports in and through the wall of said shaft adjacent the top end thereof and tangentially of said axis, burner means connected with said second-named ports to supply flame and gas to said shaft, a melting pot mounted above said shaft, means in heat exchange relation with said pot for melting raw batch ingredients therein, a rotor journaled in said shaft immediately beneath said cover, for rotation on said axis, said rotor having a central axial passageway terminating in a plurality of radial, circumferentially-spaced ducts opening through its periphery, second conduit means for feeding liquid raw batch ingredients from said pot to said passageway, means operable to spin said rotor, and reservoir means in communication with said shaft at the base thereof, for collecting droplets of nascent glass descending in and along said shaft.

2. The furnace of claim 1, granular raw batch ingredients, flame and gas being projected into said shaft through each of said ports.

3. A glass furnace comprising a hollow shaft for the melting of the glass batch material having at its upper part at least one aperture for the admission of raw material, a plurality of peripherally arranged burner-ports in the shaft which are aligned to direct heating flames circumferentially and generate a cyclonic swirling motion of the gases in the shaft, means to melt some raw materials, conduit means to conduct the molten raw materials into the cyclonic flames, means to inject solid constituents of the raw materials in a finely divided state into the cyclonic flames containing the molten part, whereby the molten and solid parts fuse and combine in the swirling flames, and discharge means at the bottom of the shaft for the release of the hot gases and the discharge of molten glass.

4. A glass furnace according to claim 3 comprising a crucible provided with heating means for melting some of the raw materials to form the liquid part, and conduit means connecting said crucible to the said upper aperture in the shaft.

5. Apparatus according to claim 4 wherein the conduit means comprises a distributor, connected within the upper part of the shaft to the upper aperture, and which has a plurality of orifices round its periphery to ensure even distribution of the liquid within the shaft.

6. Apparatus according to claim 5 wherein the distributor is rotatably mounted and is rotated by driving means.

7. Apparatus according to claim 6 wherein said driving means comprises paddles fixed to the bottom of the receiver and subjected to the action of the gaseous currents within the furnace.

8. Apparatus according to claim 3 wherein granular injection means project tangentially through burner ports in the side walls of the furnace.

9. Apparatus according to claim 3 comprising blower means connected to the supply of granular raw materials and to the shaft of the furnace whereby to drive granules into the swirling flames in a current of gas.

10. Apparatus according to claim 3 including means to preheat the granular material of the constituents of the mixture.

11. Apparatus according to claim 10 wherein the shaft has a double wall jacket, means to circulate a cooling fluid therethrough, and means to bring the thus heated fluid into heat exchanging relation to the granular raw material.

12. Apparatus according to claim 10 including means to circulate hot flue gases from the furnace around the raw materials.

References Cited

UNITED STATES PATENTS

| | | | |
|---|---|---|---|
| 2,371,213 | 3/1945 | Batchell | 65—142 XR |
| 2,455,907 | 12/1948 | Slayter | 65—142 XR |
| 2,597,640 | 5/1952 | Howard | 65—335 XR |
| 2,634,116 | 4/1953 | Witt | 65—21 XR |
| 2,760,771 | 8/1956 | Knappe | 266—27 |
| 3,223,508 | 12/1965 | Wolf | 65—142 |
| 3,350,213 | 10/1967 | Peyches | 65—21 XR |

FRANK W. MIGA, Primary Examiner

U.S. Cl. X.R.

65—142, 337, 346; 263—29; 266—27